United States Patent [19]

Capo et al.

[11] 4,138,041
[45] Feb. 6, 1979

[54] DISPENSING CARTON

[75] Inventors: James L. Capo, Franklin, Ohio; Howard D. Zint, Florence, Ky.

[73] Assignee: International Paper Company, New York, N.Y.

[21] Appl. No.: 809,358

[22] Filed: Jun. 23, 1977

[51] Int. Cl.² .................. B65D 5/76; G01F 11/28
[52] U.S. Cl. .................... 222/456; 222/561; 229/17 SC
[58] Field of Search .............. 222/454, 455, 456, 561; 229/17 SC, 7 SC

[56] References Cited

U.S. PATENT DOCUMENTS

| | | | |
|---|---|---|---|
| 2,393,262 | 1/1946 | Percy | 222/455 |
| 3,819,093 | 6/1974 | Forbes | 229/17 SC X |

Primary Examiner—Stanley H. Tollberg
Assistant Examiner—John P. Shannon
Attorney, Agent, or Firm—Walt Thomas Zielinski; Richard J. Ancel

[57] ABSTRACT

A dispenser carton capable of being formed from a single-piece paperboard blank is disclosed. The blank is suitable for erection into a rigid, rectangular container having a measuring chamber therein which is provided with a "locked-in", slide-valve discharge opening at the dispensing end of the chamber which is reclosable.

4 Claims, 11 Drawing Figures

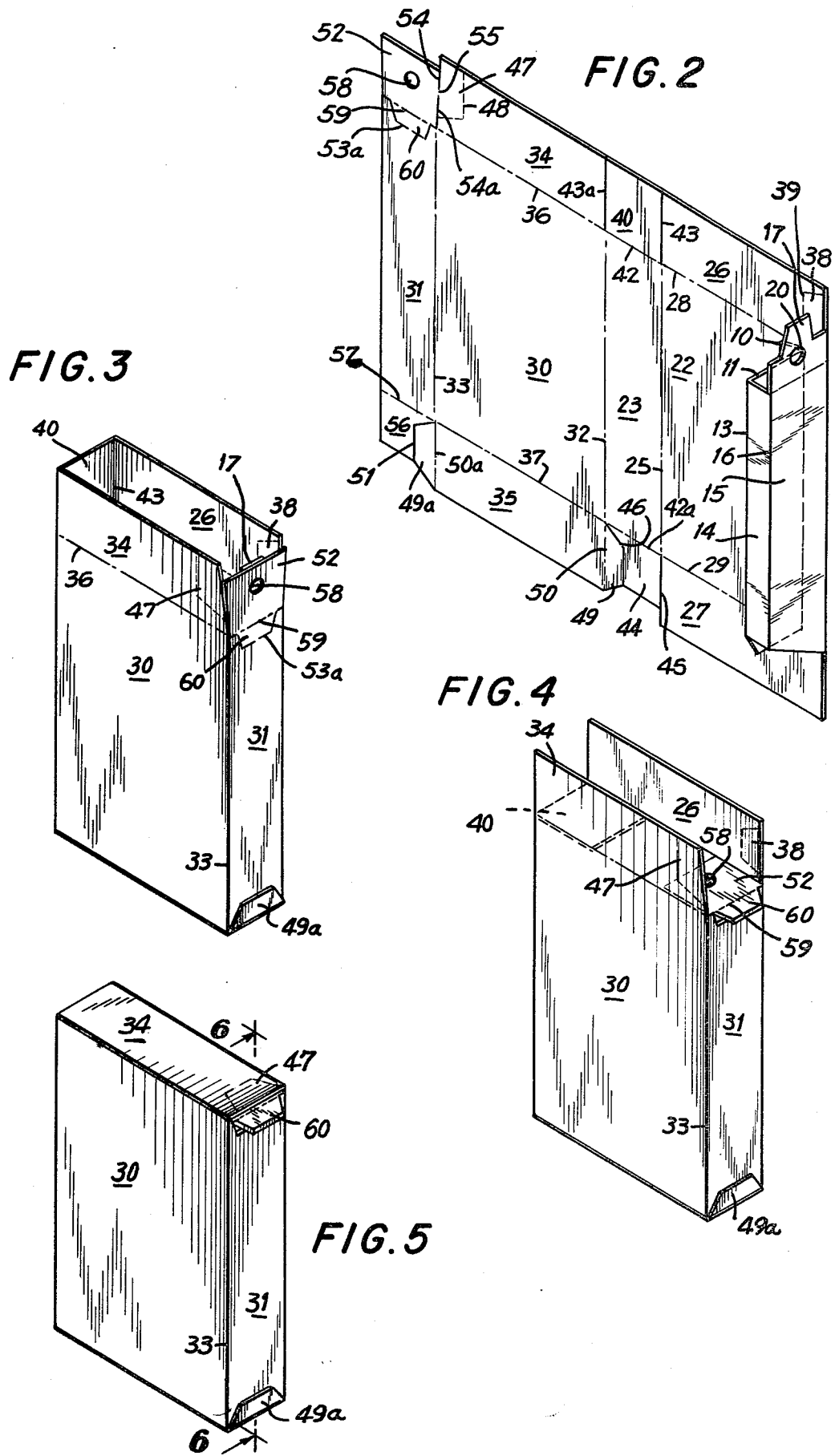

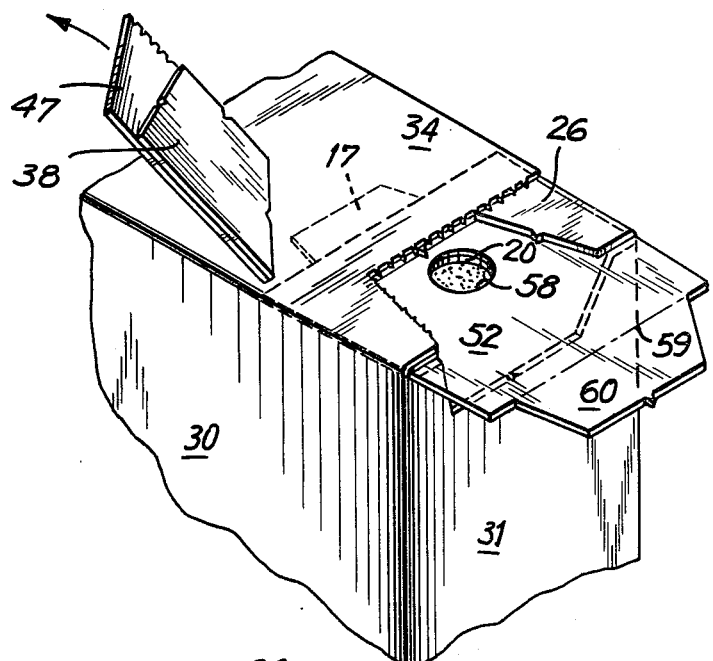
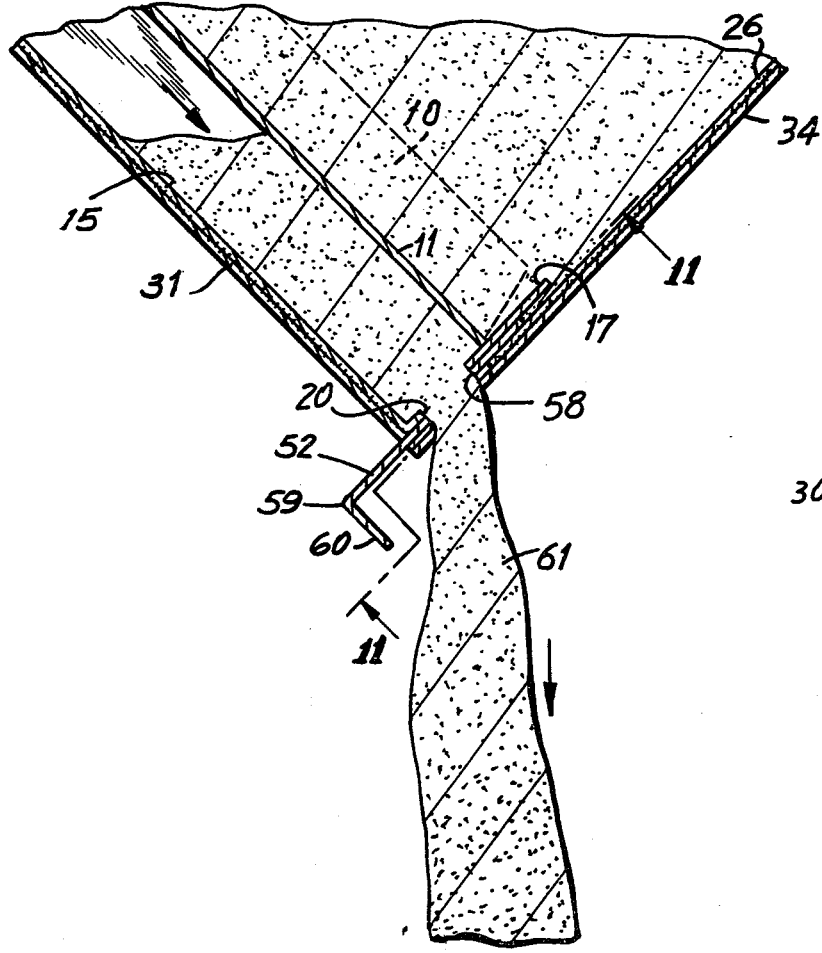
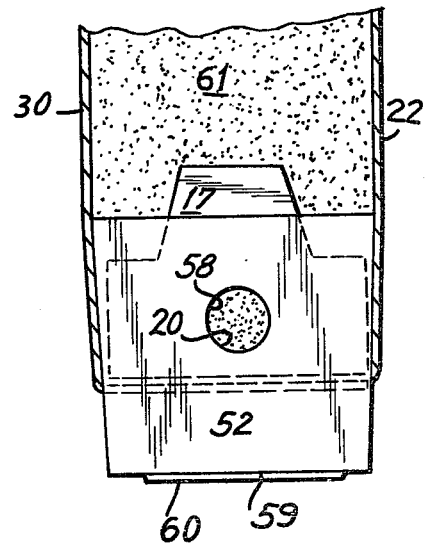

DISPENSING CARTON

BACKGROUND OF THE INVENTION

This invention relates generally to a dispensing carton. More particularly, it relates to a dispensing carton which is capable of being formed from a single-piece blank of foldable paperboard and has a measuring or metered dispensing chamber therein and is provided with a new and useful reclosable, slide valve opening. The various elements making up the entire carton are included in, and, some are separable from, the blank. In other words, the side walls, the end walls, and the flaps thereof, including the opening tabs and the slide valve removable therefrom, and the panels making up the measuring chamber are all included in the blank as initially formed.

In the practice of manufacturing packages for granular substances, particularly powder soaps and detergents of the types intended for use in modern automatic washing machines, as well as other similar flowable materials for home use, various means have been provided for dispensing predetermined amounts of such substances, in substantially exact quantities, as they are poured from the carton. In addition to providing more simplified means for dispensing such predetermined amounts, it has become more essential that such cartons be provided with reliable and reusable means for opening and closing the discharge opening thereof. Such means would have to be secure and capable of adequately protecting the contents of the cartons from dust and other forms of contamination. More importantly, any movable component included in such means should be secured beyond the extent of its intended movement. In order to meet the foregoing requirements, such discharge openings must be designed so as to avoid any inadvertent destruction of the carton as a result of the intended continuous usage thereof.

Since the manufacturer of powdered soaps, detergents, and other pourable granular substances to be packaged usually assembles the carton, either manually or by means of appropriate machines, into its desired erected form, the original form of the carton construction which he receives is another important factor to be considered. Obviously, the task of the manufacturer of the goods to be packaged is complicated if he is required, to any considerable extent, to rely on the use of extraneous means such as staples, straps, rivets, etc., in order to assemble and secure the carton in its desired form. Therefore, simplicity of the carton blank design is a very important factor. These problems are resolved by incorporating into the blank all of the necessary members and by minimizing the use and cost of the most reliable and most efficient means by which the carton is to be secured in its desired erected form.

Accordingly, it is an object of this invention to provide a dispensing carton having a measuring chamber therein and a "locked-in" reclosable discharge opening therefor. It is another object of this invention to provide a metered dispensing carton which has a novel "locked-in" reclosable discharge opening and is capable of being formed from a single-piece paperboard blank; the operating means for opening and closing said "locked-in" reclosable discharge opening being comprised of a push-pull, slide valve which is included in the carton blank construction. Another object of this invention is to provide a metered dispensing carton of the foregoing description which as a dust-resistant, reclosable discharge opening.

With these and other objects in view, the nature of which will become more apparent, the invention will be more fully understood by reference to the attached drawings, the accompanying detailed description and the appended claims.

The dispensing carton, in accordance with this invention, is formed by folding a unitary paperboard blank along score lines into, preferably, a substantially rectangular construction which is secured by means of glue applied in designated areas. The measuring chamber therein and the novel reclosable discharge opening mechanism therefor are integrally included in the blank, with separate glue means being provided for securing the measuring chamber, in its intended form, within the erected carton.

The novel means for operating the reclosable discharge opening is comprised of an assembly of overlapping flaps and an underlying flap, having a push-pull slide valve member interposed therebetween. Both the underlying flap and the slide valve situated thereon are provided with apertures which are aligned, when the reclosable discharge opening is in the open position. The slide valve member is provided with a pull tab at one end which is tapered in the direction toward the tab end. The substantially trapezoidal design of the novel slide valve member is such that it allows the slide to become virtually locked in place while wedged between the overlapping flaps and the underlying flap, thereby preventing the inadvertent withdrawal of the slide valve from the dispensing carton.

In the drawings,

FIG. 2 is a perspective view of the blank from which the dispensing carton is formed at the stage wherein only the measuring chamber is erected;

FIG. 3 is a perspective view of the nearly, fully erected dispensing carton, with the entire top portion yet to be closed;

FIG. 4 is a perspective view of the nearly fully erected dispensing carton, with only the end flaps of the top portion in their intended position and the side flaps remaining in their original unfolded position;

FIG. 5 is a perspective view of the fully erected dispensing carton, with the removable opening tabs and the slide valve remaining intact;

FIG. 9 is perspective fragmentary view of the reclosable opening showing the separable opening tabs removed therefrom and the slide valve in open position;

FIG. 10 is a fragmentary, cross-sectional view of the reclosable opening when the carton is inverted, with the slide valve in opened position taken along line 6—6 of FIG. 5, and FIG. 11 is a fragmentary, cross-sectional plan view of the reclosable opening, with the slide valve in opened position, taken along line 11—11 of FIG. 10.

Figure 1:
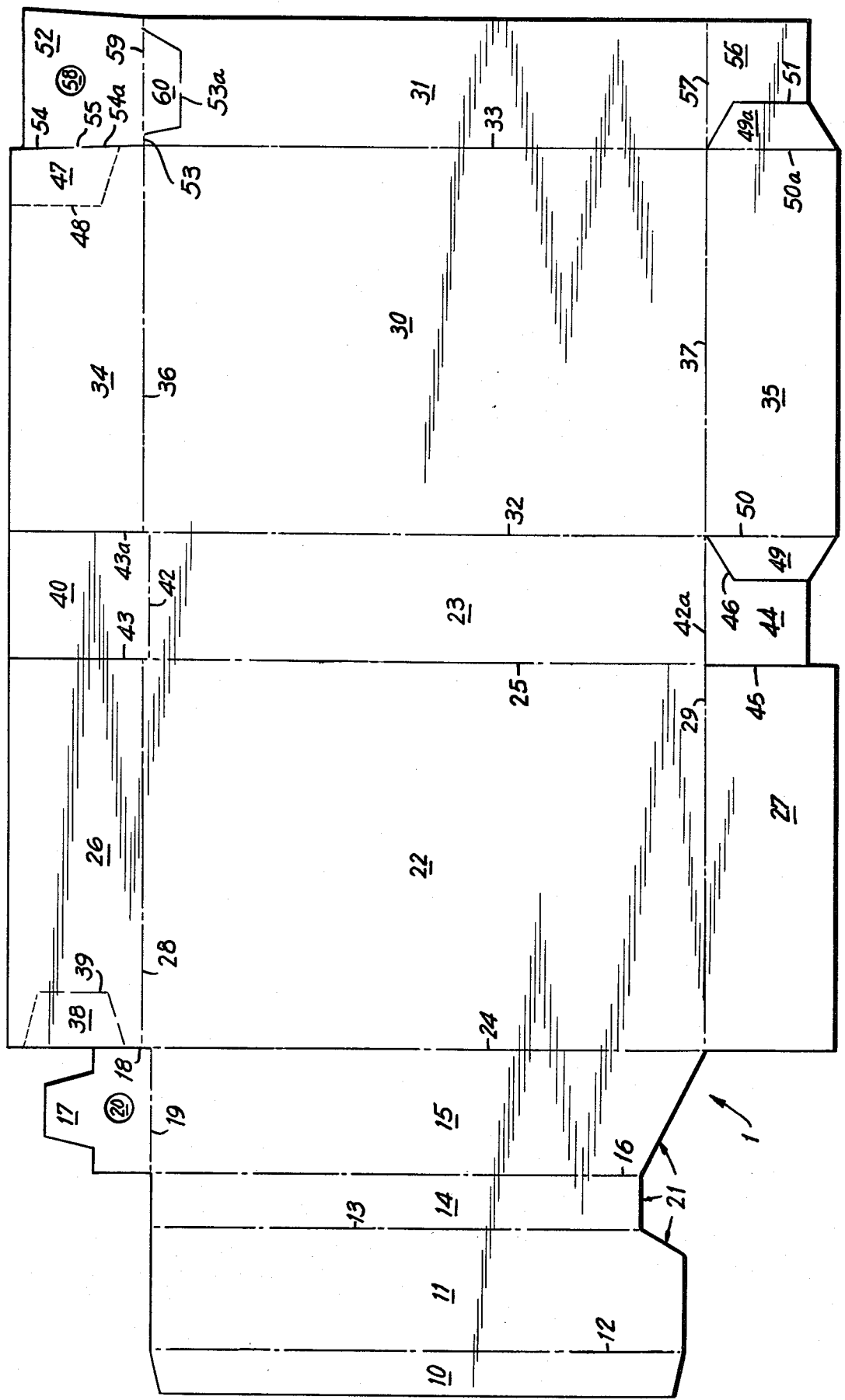
FIG. 1 is a plan view of the integrated blank from which the dispensing carton, in accordance with this invention, is formed.

Referring to the drawings, in detail, the invention as illustrated, is embodied in a dispensing carton having a measuring chamber therein and a reclosable opening therefor formed from a single-piece, generally rectangular blank 1 shown in FIG. 1.

Blank 1 is provided with a first series of substantially rectangular members which make up the measuring chamber of the dispensing carton; including an end glue flap 10 and a partition 11 which are hingedly connected to one another by means of a longitudinal fold line 12, an intermediate glue flap 14 which is hingedly connected to said partition panel 11 by means of a longitudinal fold line 13, and a baffle 15 which is hingedly connected to intermediate glue flap 14 by means of a longitudinal fold line 16, and a tabbed baffle flap 17 which is defined by a slit 18 and a lateral fold line 19. Tabbed baffle flap 17 is provided with means defining a substantially centrally located aperture 20. End glue flap 10, partition panel 11, and baffle 15 are all of essentially the same length, with the latter two being of substantially the same dimensions, except for the indentation or cut-away portion 21 occurring in the lower sections thereof, the precise function of which will be further described hereinafter. Intermediate glue flap 14 is of substantially lesser width than glue flap 10 and is shorter in length than partition panel 11 and baffle 15, to the extent defined by the cut-away portion 21.

The blank 1 is also provided with a second series of substantially rectangular members which make-up the container portion of the dispensing carton, including a side wall panel 22 which is hingedly connected to baffle partition 15 and end wall panel 23 by means of longitudinal fold lines 24 and 25 respectively, and, to inner top flap 26 and to inner bottom flap 27 by means of lateral fold lines 28 and 29, respectively; another side wall panel 30 which is hingedly connected to end wall panel 23 and to another end wall panel 31 by means of longitudinal fold lines 32 and 33, respectively, and, to outer top flap 34 and outer bottom flap 35 by means of lateral fold lines 36 and 37, respectively.

Inner top flap 26 is provided with an lower opening tab 38 which is defined therein by means of a line of weakness, perforated score line 39. End wall panel 23 is provided with intermediate top flap 40 which is hingedly connected thereto by means of lateral fold line 42 and defined by longitudinal slit lines 43 and 43a extended in a direction perpendicular to fold line 42 and with intermediate bottom flap 44 which is hingedly connected thereto by means of lateral fold line 42a and is defined by longitudinal slit lines 45 and 46. Lateral fold line 42a is coextensive with lateral fold lines 29 and 37, while lateral fold line 42 is slightly offset from, but parallel to, coextensive lateral fold lines 28 and 36.

Outer top flap 34 is provided with an upper opening tab 47 which is defined therein by means of a line of weakness perforated score line 48. Bottom flap 35 is provided with a pair of bottom end tabs, 49 and 49a which are hingedly connected thereto by means of longitudinal fold lines 50 and 50a, respectively. Bottom end tabs 49 and 49a are also defined by slit lines 46 and 51, respectively.

End wall panel 31 is provided with a substantially trapezoidal slide valve member 52 which is defined by slit lines 54 and 54a and lateral line of weakness, perforated score lines 53 and 53a, with the latter two lines also defining the tabbed end 60 thereof. Slide valve member 52 is detachably connected to upper opening tab 47 by means of a connecting segment 55 which is intermittently disposed between slit lines 54 and 54a. Slide valve member 52 is further provided with means defining an aperture 58, a lateral fold line 59, and tabbed end 60 which is defined by lateral perforated lines 53 and 53a. Lateral fold line 59 is disposed between an coextensive with lateral perforated line 53 in a direction parallel to the edge of slide valve member 52 which is defined by perforated score line 53a. Slide valve member 52 tapers inwardly (and slit lines 54 and 54a are not coextensive with fold line 33) from its free edge opposite the tabbed end which is defined by lateral perforated lines 53 and 53a. The extent to which slide valve member 52 is tapered is defined, on one side, by the slight degree to which slit lines 54 and 54a are angularly disposed from a line coextensive to longitudinal fold line 33, and similarly, on the side opposite thereto, from a line coextensive with the longitudinal free edge of end wall panel 31. Initially, when blank 1 is made, longitudinal slit lines 54 and 54a and lateral perforated lines 53 and 53a are partial and are completed only to the extent required for slide valve 52 to remain detachably connected to outer top flap 34 and end wall panel 31, respectively, during the gluing and erecting operations. For this reason, these relatively small portions of the blank, along the last-mentioned slit lines, are preferably left intact initially. End wall panel 31 is also provided with a bottom flap 56 which is hingedly connected thereto by means of lateral fold line 57.

In accordance with this invention, the dispensing carton herein is erected from the blank illustrated in FIG. 1 by first forming the measuring chamber by applying a thin glue line to the surface of glue flap 10, in a longitudinal direction, folding baffle 15 inwardly along longitudinal fold line 24 to the point at which the baffle 15 is substantially perpendicular to side wall panel 22, folding end glue flap 10 further inwardly, and partition panel 11 and intermediate glue flap 14 along vertical fold lines 12, 13, and 16, respectively; adhesively securing end glue flap 10 to the inner surface of side wall panel 22 as shown in FIG. 2.

Next the container portion of the dispensing carton is formed, as shown in FIG. 3 by applying thin glue lines to the inner surfaces of end wall panel 31 and to bottom end tabs 49 and 49a, in a longitudinal direction; folding end wall panel 23 upwardly, side wall panel 30 and end wall panel 31 along longitudinal fold lines 32 and 33, respectively; adhesively securing the inner surface of end wall panel 31 to the outer surface of baffle 15; folding bottom flaps 44 and 56 inwardly and upwardly along lateral fold lines 42 and 57, respectively; folding inner bottom flap 27 inwardly and upwardly along lateral fold line 29 so that it overlies bottom flaps 44 and 56; folding outer bottom flap 35 so that it overlaps inner bottom flap 27; folding bottom end wall tabs 49 and 49a upwardly along longitudinal fold lines 50 and 50a, respectively, and then adhesively securing the latter tabs to the outer surface of the corresponding end wall panels 23 and 31, respectively.

At this point, it should be noted that the manufacturer of the granular substance to be packaged will usually prefer to fill the dispensing carton prior to closing the top of the container portion.

Once the container portion of the dispensing carton has been filled with the substance to be packaged, the reclosable discharge opening portion of the dispensing carton is formed by applying a substantial glue line to the inner surface of upper top flap 26 in the stippled area as indicated in FIGS. 2–4, folding top flap 40 inwardly, along lateral fold line 42, folding tabbed baffle flap 17 inwardly along lateral fold line 19; and folding slide valve member 52 contiguous thereto along lateral weakened score line 53 until the latter becomes superposed on baffle flap 17, with the detached tabbed end 60 which is defined by lateral fold line 59 projecting outwardly therefrom in a direction perpendicular to end wall panel 31 as shown in FIG. 4. Then inner top flap 26 is folded inwardly so that it overlies slide valve 52, and outer top flap 34 is folded forwardly along lateral fold line 36 so that it overlies inner top flap 26. Thereafter, the latter two flaps, including the upper opening tab 47 and the lower opening tab 38, respectively defined therein, are adhesively secured to one another as in FIG. 5.

Figure 6:
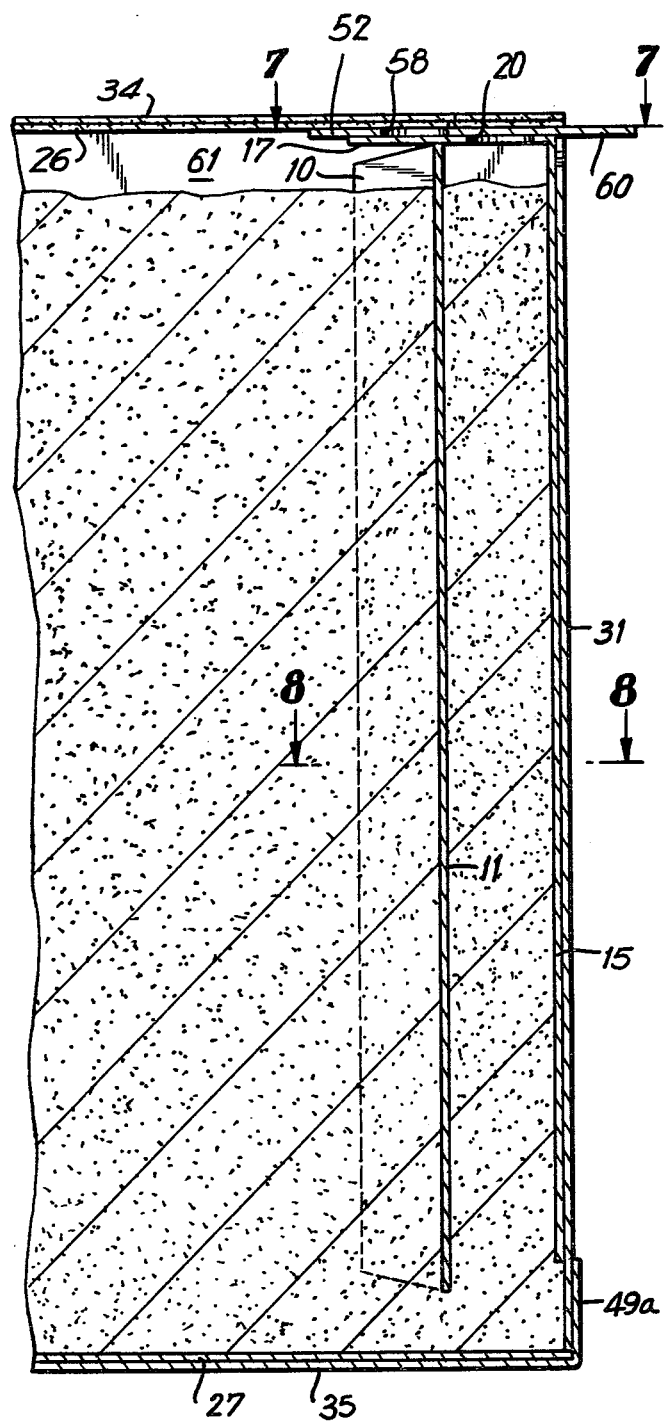
FIG. 6 is a cross-sectional side view of the dispensing carton in the area of the measuring chamber and the reclosable discharge opening thereof, with removable opening tabs and the slide valve remaining intact, taken along line 6—6 of FIG. 5.
Figure 7:
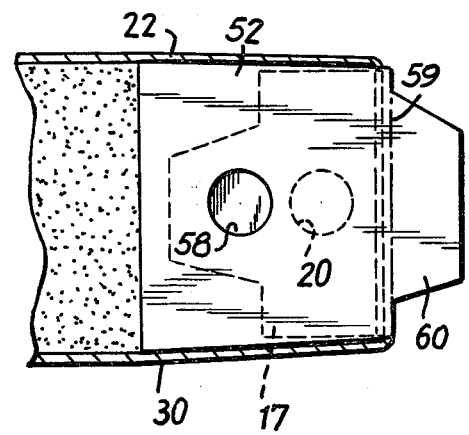
FIG. 7 is a fragmentary, cross-sectional plan view of the fully erected dispensing carton in the area of the reclosable discharge opening, with the slide valve in closed position, taken along line 7—7 of FIG. 6.
Figure 8:
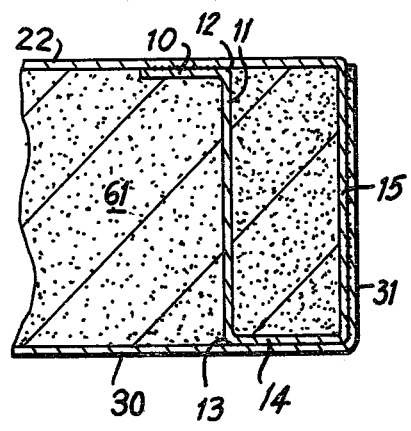
FIG. 8 is a cross-sectional plan view of the fully erected measuring chamber, taken along line 8—8 of FIG. 6.

The multi-layered assembly of the reclosable discharge opening as shown, in the closed position, in FIG. 6 and, in opened position, in FIG. 7. It provides a well self-supported construction. The sandwich-like configuration of the over-lapping outer and inner top flaps 34 and 26, respectively, and the underlying baffle flap 17, with the slide valve member 52 disposed therebetween, form a well-secured, reclosable discharge opening assembly. The trapezoidal design of the slide valve 52 as shown in FIGS. 7, 9, and 11, is such that the inadvertent complete withdrawal thereof from the discharge opening is prevented.

The dispensing carton of this invention is initially opened by tearing away the upper opening tab 47 and the lower opening tab 38 laminated thereto, as shown in FIG. 9, and the reclosable discharge opening thereof is opened by detaching slide valve member 52 from end wall panel 31 by breaking or otherwise severing weakened score line 53. Then the tabbed end 60 of said slide valve member 52 is folded upwardly along lateral fold line 59 until said tabbed end 60 forms a right angle with said slide valve member 52 as shown in FIG. 11.

When it is desired to dispense a premeasured quantity of the contents 61 of the carton, slide valve aperture 58 thereof is aligned with aperture 20 of the baffle flap 17, as shown in FIGS. 9–11. The carton is then inverted and that portion of the contents 61 in the measuring chamber is poured through the discharge opening as shown in FIG. 10. The balance of the contents 61 of the carton flows to the top of the container and is prevented from flowing to the discharge opening by the partition panel 11 as also shown in FIG. 10. Upon returning the carton to its upright position, a further portion of the contents 61 can be made to flow into the measuring chamber as shown in FIG. 6, through the opening formed by the indentation 21 at the bottom of partition panel 11, intermediate glue flap 14, and baffle 15, respectively, as shown in FIG. 1. Thereafter, unless it is desired to deliver one or more further premeasured quantities in the foregoing manner, the discharge opening is closed by pushing slide valve member 52 inwardly by means of the tabbed end 60, until slide valve aperture 58 and baffle flap aperture 20 become completely disaligned as shown in FIG. 7. The thusly closed dispensing carton is then stored for future usage.

Thus, it becomes apparent that this invention provides a dispensing carton having a measuring chamber therein and a novel reclosable discharge opening therefor which can readily be erected from a single-piece paperboard blank, without the excessive use of extraneous materials such as staples, straps, rivets, etc.

The dispensing carton in this invention is formed from a blank which is of such relatively unique construction that it can be erected by either manual or mechanical means. The application of the glue in the specially designed areas of the blank to secure the various members thereof adhesively can be carried out by any conventional technique.

While the present invention is specifically directed towards a particular dispensing carton, it is to be understood that the concept of the novel reclosable discharge opening therefor is readily applicable to cartons without measuring chambers. Those of ordinary skill in the art will further recognize that variations and modifications of this invention can be made without departing from the spirit and scope which is limited by the following claims.

What is claimed:

1. A dispensing carton having a measuring chamber therewithin and a reclosable discharge opening therefor, which is formed from a single-piece paperboard blank and comprises:
   (a) a substantially rectangular container portion defined by a first series of hingedly connected members, including side wall panels, end wall panels, an inner top flap, an intermediate top flap, an outer top flap, an inner bottom flap, an intermediate bottom flap, and an outer bottom flap, wherein said inner top flap is provided with a lower opening tab which is defined by a perforated score line, and said outer top flap is provided with an upper opening tab which is defined by a perforated score line;
   (b) a substantially rectangular measuring chamber portion defined by a second series of hingedly connected members including an end glue flap, a partition panel, an intermediate glue flap, and a baffle, wherein said baffle is provided at its upper end with a baffle flap which is hingedly connected thereto; and
   (c) a rectangular discharge opening assembly which, when said dispensing carton is erected, is comprised of (i) portions of said outer top flap, which are positioned to overlap portions of said inner top flap; (ii) said baffle flap; and (iii) a tapered slide valve member, which is disposed between said inner top flap and said baffle flap.

2. The dispensing carton of claim 1 wherein said tapered slide valve member is detachably connected to one of said end wall panels by a perforated score line.

3. The dispensing carton of claim 2 wherein said baffle flap has an aperture therein and said partition panel, said intermediate glue flap, and said baffle are cut-away at the bottom ends thereof to provide a relatively large opening between said measuring chamber and the remaining interior of said dispensing carton when said dispensing carton is erected.

4. A dispensing carton, having a measuring chamber therein and a reclosable discharge opening therefor which is formed from a single-piece paperboard blank comprising:
   (a) a substantially rectangular container portion defined by a first series of hingedly connected members, including side wall panels, end wall panels, an outer top flap, an intermediate top flap, an inner top flap, an outer bottom flap, an intermediate bottom flap, and an inner bottom flap; said inner top flap being provided with a lower opening tab which is defined therein by means of a perforated score line, and said outer top flap being provided with an upper opening tab which is also defined therein by means of a perforated score line; one of said end wall panels being provided with a tapered slide valve member detachably connected thereto by means of a perforated score line; said tapered slide valve member being provided with an aperture and a tabbed end;

(b) a substantially rectangular measuring chamber portion defined by a second series of hingedly connected members including a baffle, an intermediate glue flap, a partition panel, and an end glue flap; said baffle being hingedly connected to one of said side wall panels and provided with a baffle flap which is hingedly connected thereto and has an aperture therein, said baffle and said partition panel being cut-away at the bottom ends to provide a relatively large opening between said measuring chamber and the remaining interior of the carton, when said dispensing carton is erected;

(c) a reclosable discharge opening portion which, when said dispensing carton is erected, is defined by said outer top flap, having the upper opening tab therein, overlapping said inner top flap, having the lower opening tab therein, so that said upper opening tab is superposed on the latter, with said baffle flap inwardly folded thereunder, with said detachable slide valve member disposed between said baffle flap and said inner top flap; and (d) means for operating said reclosable discharge opening in the erected carton, including said movable slide valve member which is detached from said end wall panel and is withdrawn by means of the tabbed end thereof to open said discharge opening by aligning the aperture therein with the aperture of said underlying inwardly folded baffle flap and is pushed-in to reclose said discharge opening by completely disaligning said apertures; and (e) means for retaining said slide valve member within its engaged position, in the erected carton, including a multilayered assembly of said overlapping outer top flap and said inner top flap adhesively secured to one another, and said underlying inwardly folded baffle flap, wherein the tabbed end of said slide valve member extends outwardly therefrom so as to remain free; said slide valve member being tapered in the direction of its tabbed end.

* * * * *